United States Patent
Adams

[15] 3,657,514
[45] Apr. 18, 1972

[54] ELECTRICAL DEICER FOR AIRCRAFT PROPELLER
[72] Inventor: Lowell J. Adams, Cuyahoga Falls, Ohio
[73] Assignee: The B. F. Goodrich Company, New York, N.Y.
[22] Filed: June 3, 1970
[21] Appl. No.: 42,945

[52] U.S. Cl. ................................. 219/201, 244/134
[51] Int. Cl. ................................................ H05b 1/00
[58] Field of Search ........... 219/201, 202; 244/134 D, 134 R

[56] References Cited

UNITED STATES PATENTS

| | | | |
|---|---|---|---|
| 3,123,327 | 3/1964 | Padgett, Jr. | 244/134 D |
| 3,183,975 | 5/1965 | Keen | 170/135.22 |
| 3,420,476 | 1/1969 | Volkner et al. | 244/134 D |
| 3,496,331 | 2/1970 | Fleury et al. | 219/201 |

FOREIGN PATENTS OR APPLICATIONS 1,087,564  10/1967  Great Britain ................... 244/134 D

OTHER PUBLICATIONS

"Electric De-icing System" by Hamilton Standard Propellers September 1947 pages 1, 4–5, 13–14, 15 and 37.

Primary Examiner—J. V. Truhe
Assistant Examiner—Gale R. Peterson
Attorney—John D. Haney and Harold S. Meyer

[57] ABSTRACT

Multiple heater deicer boots for propeller blades having a power source on the aircraft and an electrical connection through brushes and slip rings. Rectifiers are incorporated in the heater circuits and switches are provided for changing the polarity of voltage applied to the two wires connected to the heater circuits so that two brushes and two slip rings provide the electrical connection between the aircraft and rotating propeller for cycling power separately to each heater in the deicer boots.

7 Claims, 7 Drawing Figures

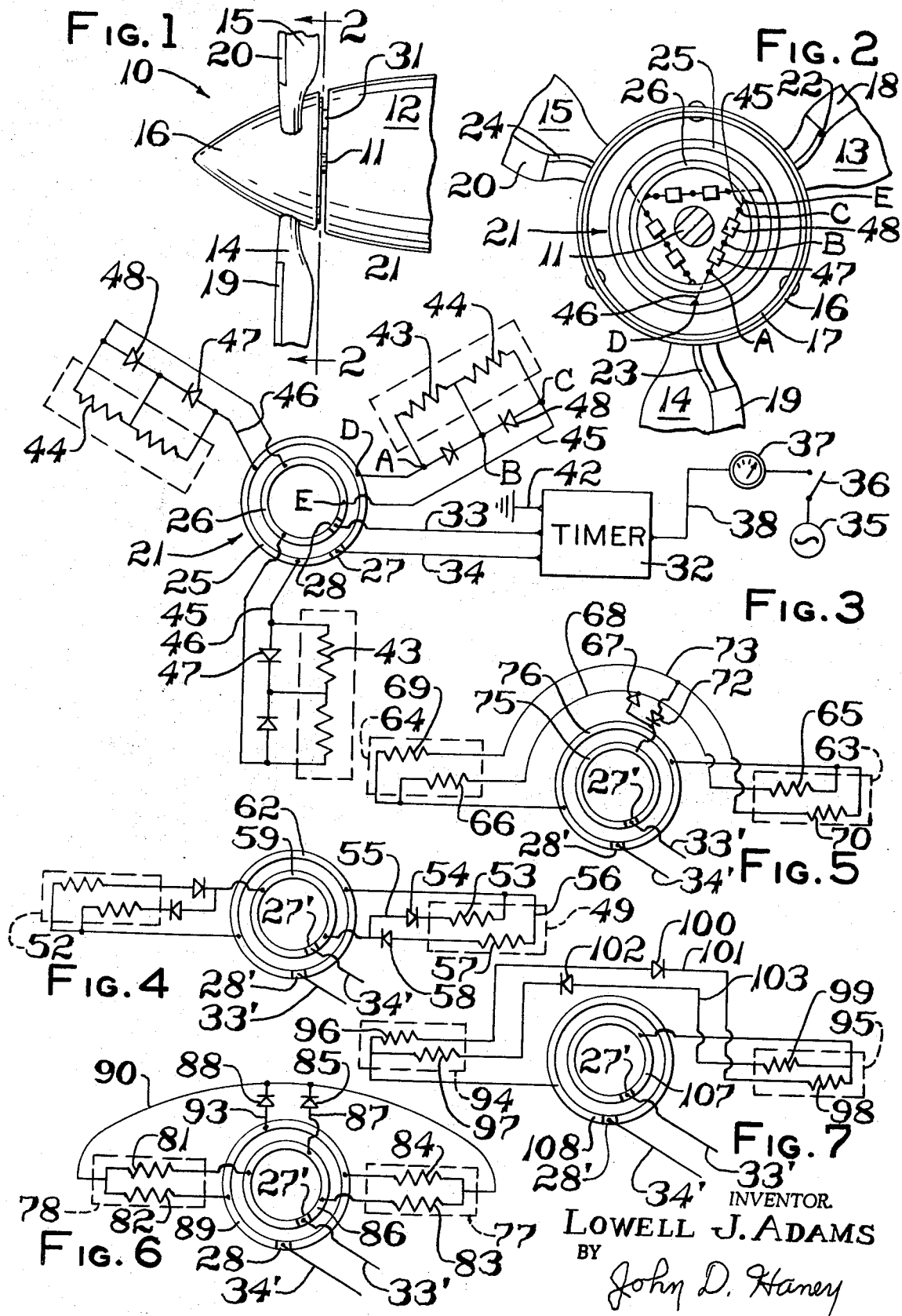

3,657,514

ELECTRICAL DEICER FOR AIRCRAFT PROPELLER

BACKGROUND OF THE INVENTION

This invention relates to propeller deicing systems and especially to electrically heated deicers which are bonded to the propeller blades. These deicers contain electrical resistance heaters which are cyclically heated to release the ice which accumulates on the propeller blades.

A substantial amount of electrical power is needed to release the ice from a section of the propeller deicer and therefore it has been the practice to divide the deicer into segments which are heated separately and cyclically to conserve the electrical power. For example, a deicer boot may have two separate heaters, one for the outboard end of the boot and one for the inboard end. During operation of the deicer the inboard heater will be turned on for a period of time to deice the inboard end of the boot and then the power will be turned off in that heater and turned on in the outboard heater.

Heretofore, this system required three leads for operation. One of these leads was to a ground which was common for both heaters and the other leads were separate connections to the individual heaters so that power could be cycled separately to each heater from a power source in the airplane through a slip ring and brush block assembly. The system required three slip rings mounted on the propeller assembly and three brush blocks mounted on the airplane bulkhead. It also required a lead strap having three control wires which carried the power from the deicer boot into the propeller housing and to the terminal block for the slip rings.

A propeller deicer boot is an important safety component of an aircraft and is essential for safe flying under icing conditions. It is, therefore, important that this equipment be properly maintained for dependable operation. As a result, the three slip rings and three brush blocks as well as the three control leads in the lead strap must be inspected often and replaced when there is any sign of failure or excess wear. This is an expensive, time-consuming maintenance operation and a need has existed to reduce the maintenance and replacement of parts with this system.

SUMMARY OF THE INVENTION

The propeller deicing of this invention provides for cycling power to multiple heaters to conserve power while at the same time reducing the maintenance and parts replacement costs through the use of a circuit which requires only two leads for each propeller deicer heating system. This reduces the maintenance and replacement costs by one-third as only two slip rings and two brush blocks are required.

The electrical heater circuit for the deicers is provided with diode rectifiers for controlling the flow of current through the resistance heaters in the deicer boots. The two control leads from the brush blocks are connected to a timer switch which applies positive voltage to one wire and negative voltage to the other wire for a period of time and then reverses this voltage for another deicing period. The diode rectifiers are located in the deicer electrical circuit so that with a positive voltage on one wire, only one heater in the deicer boot is receiving power and then when the voltage is reversed only the other heater in the deicer boot will receive power. This provides the desirable cyclical deicing action with only two lead wires.

The accompanying drawings show one preferred form and four modifications of an electrical deicing circuit for a propeller deicer system made in accordance with and embodying this invention and which is representative of how this invention may be practiced.

BRIEF DESCRIPTION OF THE DRAWINGS

FIG. 1 is a fragmentary view of a three blade propeller and engine nacelle of an aircraft.

FIG. 2 is a sectional view taken along the line 2—2 of FIG. 1 showing the slip ring and terminal connections, parts being broken away.

FIG. 3 is a schematic diagram illustrating the electrical circuit for the propeller deicer system of FIGS. 1 and 2.

FIG. 4 is a schematic diagram illustrating the electrical circuit for a twin propeller deicer system showing a modification embodying the invention.

FIG. 5 is a schematic diagram illustrating another electrical circuit for a twin propeller deicer system showing another modification.

FIG. 6 is a schematic diagram illustrating the electrical circuit for a still further modification adapted to a twin propeller deicer system.

FIG. 7 is a schematic diagram illustrating the electrical circuit for a twin propeller deicer system showing another modification.

DETAILED DESCRIPTION

Referring to FIG. 1, a three-blade propeller assembly 10 is shown mounted on a propeller shaft 11 which extends from an engine nacelle 12 of an aircraft which may be a single propeller or multiple propeller aircraft. The propeller assembly 10 has three propeller blades 13, 14 and 15 which may be connected to the propeller shaft 11 by suitable mechanism well-known in the art for changing the pitch of the propeller blades. A spinner housing 16 encases the pitch controlling mechanism for the propeller blades 13, 14 and 15 and, as shown in FIG. 2, may be mounted on a spinner bulkhead 17.

Deicer boots 18, 19 and 20 are mOunted on the propeller blades 13, 14 and 15 at the leading radially inner edge where ice tends to accumulate. The deicer boots 18, 19 and 20 are connected to a slip ring assembly 21 by lead straps 22, 23 and 24. The slip ring assembly 21 is mounted securely on the propeller drive shaft 11 at a position adjacent the spinner bulkhead 17. The slip ring assembly 21 has an outer slip ring 25 and an inner slip ring 26 which are engageable with an outer brush 27 and an inner brush 28 mounted in a brush holder assembly 31 secured to the engine nacelle 12. As shown in FIG. 3, the outer brush 27 and inner brush 28 are connected to a switch means such as a timer 32 by insulated leads 33 and 34. Electrical power from a suitable power source 35 such as a direct current generator or a full wave rectified alternating current generator is supplied to the timer with a manual switch 36 and an ammeter 37 connected in the power line 38 to the timer if desired. A ground line 42 may also be connnected to the timer 32.

Each of the deicer boots 18, 19 and 20 which are shown in dotted lines in FIG. 3 has an inboard or first heater 43 and an outboard or second heater 44 molded therein. The deicer boots 18, 19 and 20 are preferably of reinforced rubber or other rubber-like material and are adherred to the inner portion of the leading edge of the propeller blades 13, 14 and 15 by a suitable adhesive.

As shown in FIGS. 2 and 3, an inner lead 45 is connected to the inner slip ring 26 at point E and to a contact point A on the slip ring assembly 21. An outer lead 46 is connected to the outer slip ring 25 at a contact point D and to a contact point A on the slip ring assembly 21. Interposed between the contact point A and contact point C is a contact point B on the slip ring assembly 21. A first diode rectifier 47 is connected to contact points A and B and a second diode rectifier 48 is connected to contact points B and C. The first heater 43 is connected to contact point A and contact point B in parallel with the first diode rectifier 47 and a second heater 44 is connected to contact point B and contact point C in parallel with said second diode rectifier 48. This results in a circuit in which the first heater 43 and first diode rectifier 47 are connected in parallel in one of two lines and the second heater 44 and second diode rectifier 48 are connected in parallel in another of two lines and these two lines are connected in series between contact points A and contact point C. In this circuit the first diode rectifier 47 is installed to unidirectionally conduct current through the second heater 44 and the second diode rectifier 48 is installed to unidirectionally conduct current through the first heater 43 depending upon whether positive voltage is applied to inner slip ring 26 or outer slip ring 25 by the inner brush 28 and outer brush 27 which are connected to a timer 32.

The timer 32 has switch means for reversing the voltage between insulated leads 33 and 34. For example, by applying positive voltage to insulated lead 34 positive voltage will be applied to outer slip ring 25 at contact point D and to outer lead 46. Current will then be unidirectionally directed through the first diode rectifier 47 but will be substantially prevented from going through second diode rectifier 48 causing the current to pass through second heater 44 and back to the inner ring 26 through inner lead 45. When the voltage is reversed and positive voltage is applied to insulated lead 33, positive voltage will be applied to inner slip ring 26 and thereby to inner lead 45 so that the current will be directed unidirectionally through the second diode rectifier 48 but will be substantially prevented from flowing through the first diode rectifier 47 and thereby the current will pass through the first heater 43 and back to outer slip ring 25.

Although the heater circuits for deicer boots 19 and 20 have not been described, they are identical to the circuit described above for deicer boot 18 and the first heaters 43 and the second heaters 44 of deicer boots 19 and 20 will have current cycled through them in the same manner as the current is cycled through the first heater 43 and the second heater 44 of the deicer boot 18.

The first diode rectifier 47 and second diode rectifier 48 shown in this embodiment are semi-conductor diodes characterized by relatively large current flow in one direction and very small current flow in the reverse direction. Preferably, these diode rectifiers are of a silicon type; however, it is understood that this system can be used with other types of diode rectifiers.

With reference to FIG. 4 a modified two-propeller electrical deicer system embodying the invention is shown in which deicer boots 49 and 52 are indicated by dotted lines. In the deicer boot 49, there are inner and outer heaters with the first heater 53 being connected in series with a first diode rectifier 54 in one line 55. In another line 56 a second heater 57 is connected in series with a second diode rectifier 58. The one line 55 and the other line 56 are then connected in parallel with one connecting point electrically connected to an inner slip ring 59 and the other connecting point being electrically connected to an outer slip ring 62.

Power is supplied to the inner slip ring 59 and the outer slip ring 62 by brushes 27' and 28' connected to insulated lines 33' and 34' connected to a timer and power source such as that shown in the circuit for FIG. 3. In operation when positive voltage is applied to the inner ring 59 the first diode rectifier 54 will unidirectionally conduct current through the first heater 53 while the second diode rectifier 58 will substantially prevent the flow of current through the second heater 57. The diode rectifier and heater circuit for the deicer boot 52 on the other blade of this propeller is identical with the arrangement described above for deicer boot 49 and operates in the same manner.

Referring to FIG. 5, another modification adapted for a twin blade propeller is shown having deicer boots 63 and 64 indicated by dotted lines. As shown in FIG. 5, a pair of heaters 65 and 66 are connected in parallel with one of the heaters 66 being mounted in deicer boot 64 and the other heater 65 being mounted in the deicer boot 63. The first diode rectifier 67 is connected in series with this first pair of heaters 65 and 66 in a first line 68. A second pair of heaters 69 and 70 are connected in parallel and one of the heaters 69 is mounted in deicer boot 64 and the other heater 70 is mounted in deicer boot 63. A second diode rectifier 72 is connected in series with the second pair of heaters 69 and 70 in a second line 73 which is connected in parallel with the first line 68 containing the first diode rectifier 72 and the first pair of heaters 65, 66. At the ends of the series connections of the first line 68 and second line 73 connections are provided with an inner ring 75 and an outer ring 76 of a slip ring assembly. Brushes 27' and 28' are connected to the slip rings and to a power source through insulated lines 33' and 34' and a timer mechanism such as that shown in FIG. 3.

In operation, positive voltage is applied to brush 28' and the outer slip ring 76 whereby current is conducted unidirectionally through second diode rectifier 72 and the second pair of heaters 69 and 70 in deicer boots 63 and 64. The current is substantially prevented from being carried through the first line 68 by the first diode rectifier 67. After a period of time determined by the timer 32, positive voltage is applied to brush 27' on inner slip ring 75 and current is unidirectionally directed through the first line 68 and through the first pair of heaters 65 and 66 in the deicer boots 64 and 63.

Referring to FIG. 6, a still further modification is shown in which deicer boots 77 and 78 indicated by dotted lines are mounted on the blades of a twin-blade propeller in which a first heater 81 and a second heater 82 are mounted in deicer boot 78 and a third heater 83 and fourth heater 84 are mounted in the deicer boot 77. A first diode rectifier 85 is connected in parallel with the first heater 81 and third heater 83, all of which have a common connection to an inner slip ring 86 and make up a first line 87. A second diode rectifier 88 is connected in parallel with the second heater 82 and the fourth heater 84, all of which have a common connection to the outer slip ring 89 and make up a second line 93. First line 87 and second line 93 are connected to each other at one end and also to the other ends of the first heater 81, second heater 82, third heater 83 and fourth heater 84 through a common connector line 90, shown in FIG. 6. Brushes 28' and 27' contact the slip rings 86 and 89 and are connected by insulated leads 33' and 34' to a timer and power supply such as that shown in FIG. 3.

In operation, when a positive voltage is applied to the insulated lead 34' and brush 28' outer slip ring 89 supplies a positive voltage to the second line 93 and current is unidirectionally directed through the second diode rectifier 88, the common connector line 90, and through the first heater 81 and third heater 83. The current is substantially prevented from passing through the other heaters by the first diode rectifier 85. After a predetermined period of deicing, the timer 32 will reverse the voltage in the insulated leads 34' and 33' putting a positive voltage on the inner slip ring 86 whereby current will be unidirectionally conducted through the first line 87, the common connector line 90, and through the second heater 82 and fourth heater 84.

Referring to FIG. 7, a further modification is shown adapted to a propeller having twin propeller blades on which deicer boots 94 and 95, as shown in dotted lines, are mounted. A first heater 96 and a second heater 97 are mounted in the deicer boot 94 and a third heater 98 and a fourth heater 99 are mounted in the deicer boot 95. A first diode rectifier 100 is connected in series with the first heater 96 and a third heater 98 in a first line 101. The second heater 97 and fourth heater 99 are connected in series with a second diode rectifier 102 in a second line 103. The first line 101 is connected at both ends to a slip ring assembly with one end being connected to an inner slip ring 107 and the other end being connected to an outer slip ring 108. Likewise, the second line 103 has one end connected to the inner slip ring 107 and the other end connected to the outer slip ring 108. Brushes 27' and 28' engage the slip rings 107 and 108 and are connected to a power source through a timer, such as shown in FIG. 3, by insulated lines 33' and 34'.

In operation, when a positive voltage is applied to insulated line 33' inner slip ring 107 will have a positive voltage. Current will then be unidirectionally conducted through the second line 103, through the second diode rectifier 102, the second heater 97 and fourth heater 99. When the voltage is reversed so that the insulated lead 34' has a positive voltage which is applied to the outer slip ring 108, the current will be unidirectionally conducted through a first line 101, through the first diode rectifier 100, the first heater 96 and third heater 98.

I claim:

1. An aircraft propeller electric deicer assembly in which a boot containing two resistance-type electric heaters is mounted on a propeller blade and power to operate said heaters is supplied from a DC power source on the airplane through two brushes engaging respective slip rings mounted on the propeller wherein the improvement comprises a heater circuit having a pair of lead wires, each of which is connected to a separate slip ring and carrying power to said heaters, a pair of diode rectifiers located in said circuit so that when current flows in one direction through said circuit current will be unidirectionally conducted through one of said diode rectifiers to one of said heaters and when current flows in the opposite direction through said circuit, current will be unidirectionally conducted through the other of said heaters and voltage reversing switch means in connection between said brushes and said DC power source for reversing the polarity of connection of said DC power source to said brushes, thereby to reverse the current flow in said circuit to direct power individually and selectively to said heaters through said diode rectifiers.

2. An aircraft propeller electric deicer assembly according to claim 1 wherein the propeller has more than one blade and two said slip rings, each said blade has a boot with a heater circuit having a pair of lead wires, and each lead wire of said pair being connected to a separate slip ring.

3. An aircraft propeller electric deicer assembly according to claim 1 wherein said voltage means comprises a timer for cyclically changing the direction of current flow in said circuit after a period of time.

4. An aircraft propeller electric deicer assembly according to claim 1 wherein said diode rectifiers are semi-conductor diodes characterized by relatively large current flow in one direction and very small current flow in the reverse direction.

5. An aircraft propeller electric deicer assembly according to claim 10 wherein each of said diode rectifiers is a silicon diode.

6. An aircraft propeller electric deicer assembly for a propeller having two blades, a first deicer boot mounted on one of said blades and a second deicer boot mounted on the other of said blades, an electrical circuit including a first pair of heaters with one heater mounted in said first boot and one heater mounted in said second boot, a second pair of heaters with one heater mounted in said first boot and one heater mounted in said second boot, said first pair of heaters being connected in parallel in a first line, said second pair of heaters being connected in parallel in a second line, a first diode rectifier connected in series in said first line, a second diode rectifier connected in series in said second line, a pair of slip rings on the propeller, each end of said first line being connected to a separate one of said slip rings, each end of said second line being connected to a separate one of said slip rings, DC power means mounted on the aircraft connected to said separate slip rings by brushes and voltage reversing switch means between said power means and said brushes, said switch means being operative to reverse the connection of said power means to said brushes thereby to reverse current flow in said circuit to cyclically conduct power to said first pair of heaters through said first diode rectifier and then through said second pair of heaters through said second diode rectifier.

7. An aircraft propeller deicer assembly according to claim 6 wherein said first diode rectifier is connected in parallel with said second pair of heaters and said second diode rectifier is connected in parallel with said first pair of heaters.

* * * * *

PO-1050
(5/69)

UNITED STATES PATENT OFFICE
CERTIFICATE OF CORRECTION

Patent No. 3,657,514          Dated April 18, 1972

Inventor(s) Lowell J. Adams

It is certified that error appears in the above-identified patent and that said Letters Patent are hereby corrected as shown below:

Column 2, line 26, "mOunted" should read ---mounted---

Column 5, line 27, (claim 3), ---reversing--- should be inserted after "voltage".

Column 6, line 3, (claim 5), "claim 10" should read ---claim 4---.

Signed and sealed this 12th day of September 1972.

(SEAL)
Attest:

EDWARD M. FLETCHER, JR.          ROBERT GOTTSCHALK
Attesting Officer          Commissioner of Patents